(12) United States Patent
Khatib

(10) Patent No.: US 11,022,161 B2
(45) Date of Patent: Jun. 1, 2021

(54) CONNECTION ASSEMBLY BETWEEN TWO COMPONENTS

(71) Applicant: Kinan Khatib, Montreal (CA)

(72) Inventor: Kinan Khatib, Montreal (CA)

( * ) Notice: Subject to any disclaimer, the term of this patent is extended or adjusted under 35 U.S.C. 154(b) by 348 days.

(21) Appl. No.: 15/537,812

(22) PCT Filed: Dec. 18, 2015

(86) PCT No.: PCT/CA2015/000612
§ 371 (c)(1),
(2) Date: Jun. 19, 2017

(87) PCT Pub. No.: WO2016/095014
PCT Pub. Date: Jun. 23, 2016

(65) Prior Publication Data
US 2019/0085885 A1    Mar. 21, 2019

Related U.S. Application Data

(60) Provisional application No. 62/094,940, filed on Dec. 19, 2014.

(51) Int. Cl.
| | |
|---|---|
| *F16B 12/10* | (2006.01) |
| *A63H 33/04* | (2006.01) |
| *A63H 33/08* | (2006.01) |
| *F16B 5/00* | (2006.01) |

(52) U.S. Cl.
CPC ........... *F16B 12/10* (2013.01); *A63H 33/042* (2013.01); *A63H 33/086* (2013.01); *F16B 5/0056* (2013.01); *F16B 5/0088* (2013.01)

(58) Field of Classification Search
CPC .......... Y10T 403/7018; Y10T 403/553; F16B 12/10; F16B 5/0056; F16B 5/0088; A63H 33/086
USPC ....................................... 52/582.2
See application file for complete search history.

(56) References Cited

U.S. PATENT DOCUMENTS

| | | | | |
|---|---|---|---|---|
| 5,286,135 | A * | 2/1994 | James | ....... F16B 3/04 403/319 |
| 2010/0281803 | A1* | 11/2010 | Cappelle | ....... E04F 15/02 52/309.1 |
| 2010/0319290 | A1* | 12/2010 | Pervan | ....... E04F 15/02038 52/582.2 |
| 2011/0167750 | A1* | 7/2011 | Pervan | ....... E04C 2/30 52/588.1 |

(Continued)

*Primary Examiner* — Brian E Glessner
*Assistant Examiner* — Adam G Barlow
(74) *Attorney, Agent, or Firm* — Benoit & Cote Inc.; Michel Sofia

(57) ABSTRACT

A connection assembly comprises a first and second components having respective first and second engagement portions, and a third component. The first and second components are adapted to be engaged together via the first and second engagement portions such as to define a space therebetween. The third component is adapted to be longitudinally introduced in the space and to forcibly displace the first and second engagement portions outwardly, thereby connecting the first and second components together. Furthermore, a method comprises assembling the components and longitudinally introducing the third component in the space to forcibly displace the first and second engagement portions outwardly, thereby connecting the first and second components together.

18 Claims, 19 Drawing Sheets

(56) References Cited

U.S. PATENT DOCUMENTS

| | | | | |
|---|---|---|---|---|
| 2011/0167751 A1* | 7/2011 | Engstrom | | E04B 5/00 |
| | | | | 52/588.1 |
| 2011/0173914 A1* | 7/2011 | Engstrom | | F16B 5/0016 |
| | | | | 52/582.2 |
| 2011/0271631 A1* | 11/2011 | Engstrom | | E04F 15/02005 |
| | | | | 52/582.2 |
| 2011/0271632 A1* | 11/2011 | Cappelle | | E04F 15/02038 |
| | | | | 52/582.2 |
| 2013/0014463 A1* | 1/2013 | Pervan | | E04F 15/107 |
| | | | | 52/588.1 |
| 2013/0047536 A1* | 2/2013 | Pervan | | E04F 15/107 |
| | | | | 52/309.1 |
| 2013/0111837 A1* | 5/2013 | Devos | | B44C 5/0476 |
| | | | | 52/309.1 |
| 2014/0123586 A1* | 5/2014 | Pervan | | E04F 15/02038 |
| | | | | 52/582.2 |
| 2014/0223852 A1* | 8/2014 | Pervan | | E04B 5/00 |
| | | | | 52/582.2 |
| 2014/0290173 A1* | 10/2014 | Hamberger | | E04F 15/02038 |
| | | | | 52/582.2 |
| 2015/0337542 A1* | 11/2015 | Cappelle | | E04C 2/38 |
| | | | | 52/309.13 |
| 2016/0115695 A1* | 4/2016 | Devos | | E04F 15/02038 |
| | | | | 52/582.2 |
| 2016/0251859 A1* | 9/2016 | Pervan | | E04B 5/023 |
| | | | | 52/582.2 |

\* cited by examiner

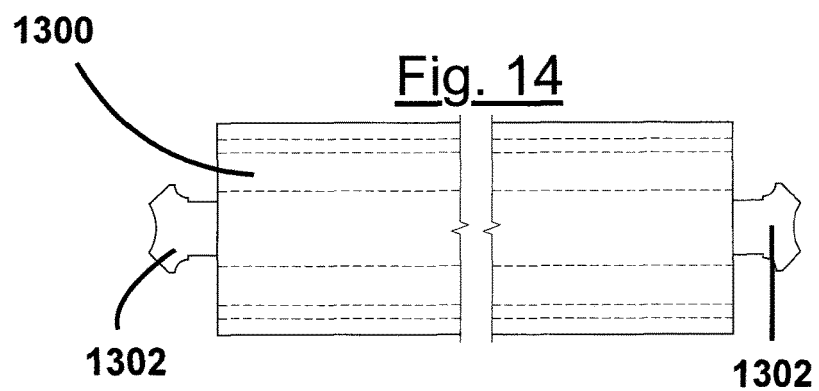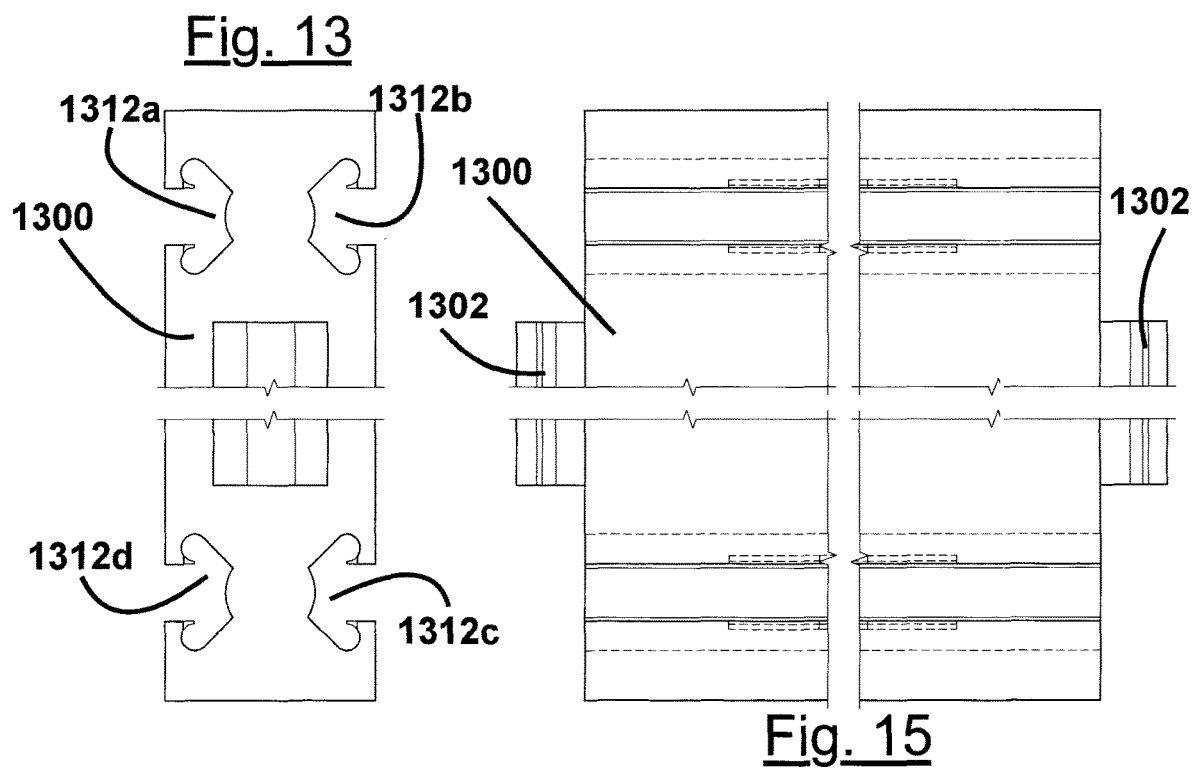

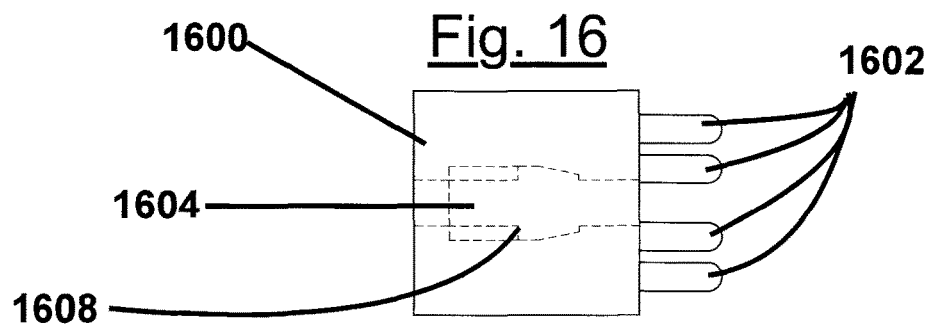
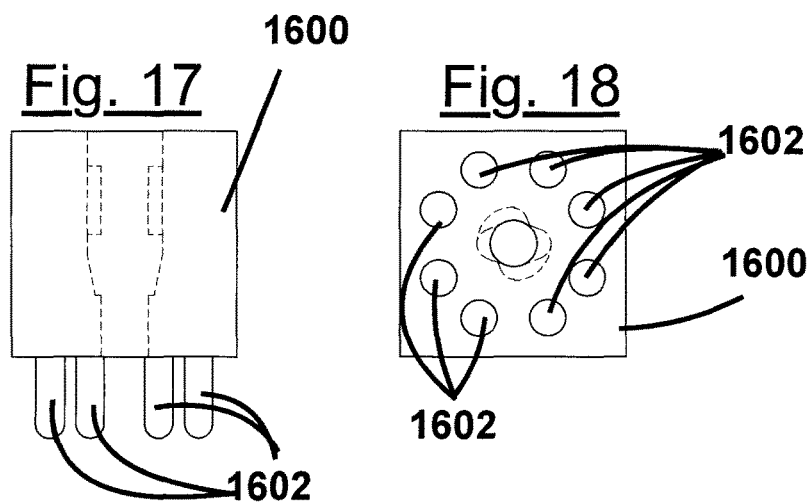
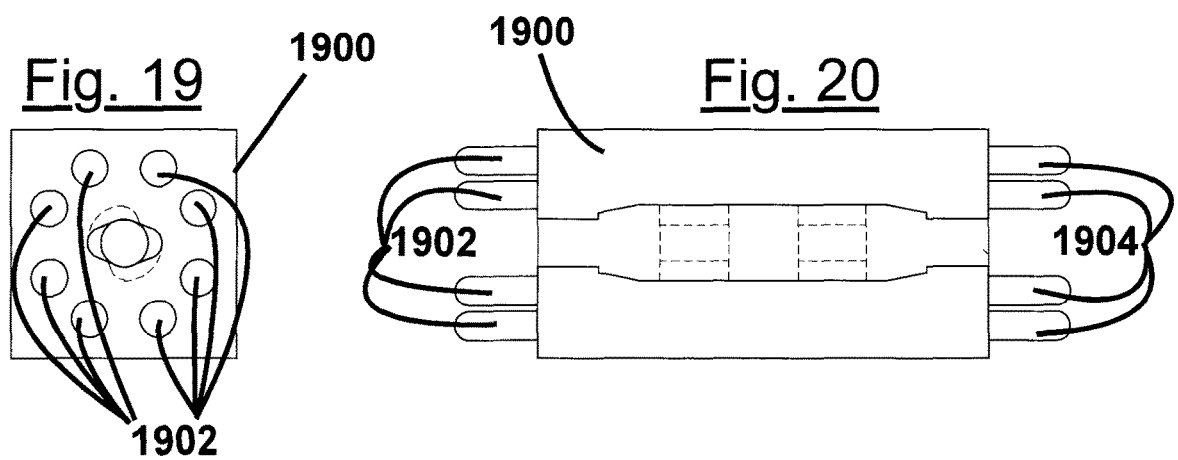

CONNECTION ASSEMBLY BETWEEN TWO COMPONENTS

CROSS REFERENCE TO RELATED APPLICATIONS

This Application claims priority on U.S. Provisional Application No. 62/094,940, filed on Dec. 19, 2014, which is herein incorporated by reference.

FIELD

The subject matter of the present disclosure relates to the connection of components and, more particularly, to devices and methods for mechanically connecting together a pair of components, such as wooden, metallic or plastics components for use in various industries, for example, construction, furniture, toys, etc.

BACKGROUND

In various industries, for example in the construction and furniture industries, it is required to connect various components together to build different structures. For instance, elongated components, e.g. made of wood, can be connected together in an axial relationship such as to make a beam or pillar, or in a transverse relationship such as to construct a framework or the like. In the furniture art, two components can be mounted together at right angles to form a leg of a table and a tabletop or a framework to support a tabletop.

Various devices have been developed to assemble such components together, including (a) glue, screws and nails for wooden components, (b) screws, rivets and welds for metallic components, and (c) glue and screws for plastic components.

Wooden construction components can also be mounted together using nail plates, and the like. Mating configurations provided on one and the other of the two components are also used to attach these components together, such as tongue-and-groove joints, mortise and tenon joints, wedged spliced joints, etc. Dowels are also used for instance for joining wooden or plastic parts. Metallic cam lock (cam screw) and nut arrangements are also used to assemble furniture components, for instance in Ikea™ furniture, as are metallic bolt and barrel nut arrangements.

Notwithstanding the above, there remains a need for new types of connections that are suited to particular circumstances and that may be more economical, easier to install, stronger, etc., than known connections.

SUMMARY

It would thus be desirable to be provided with a system, a device or a method that is adapted for connecting two components together.

According to an embodiment, there is provided a connection assembly comprising a first and second components having respective first and second engagement portions, and a third component. The first and second components are adapted to be engaged together via the first and second engagement portions such as to define a space therebetween. The third component is adapted to be longitudinally introduced in the space and to forcibly displace the first and second engagement portions outwardly, thereby connecting the first and second components together.

According to another embodiment, there is provided a method of connecting components in an assembly. The method comprises assembling a first and second components having respectively a first and second engagement portions to define a space therebetween. The method further comprises longitudinally introducing a third component in the space to forcibly displace the first and second engagement portions outwardly, thereby connecting the first and second components together.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIGS. 2a to 2d are sequential schematic perspective views illustrating a pair of further components and an associated key according to one of various exemplary embodiments; wherein FIG. 2a shows the three parts unassembled, FIG. 2b shows the pair of components in a mating arrangement, and FIGS. 2c and 2d show the pair of components in an assembled position via the key engaged thereto;

FIGS. 13 to 15 are a front, top and side views of a component to be assembled to the component of FIGS. 10 to 12;

FIGS. 16 to 18 are front, top and side views of a component housing a plurality of keys to be used in combination with components of FIGS. 10 to 15;

FIGS. 19 and 20 are front and side views of an alternative component as the one illustrated in FIGS. 16 to 18;

DESCRIPTION OF VARIOUS EMBODIMENTS

Figure 1A:
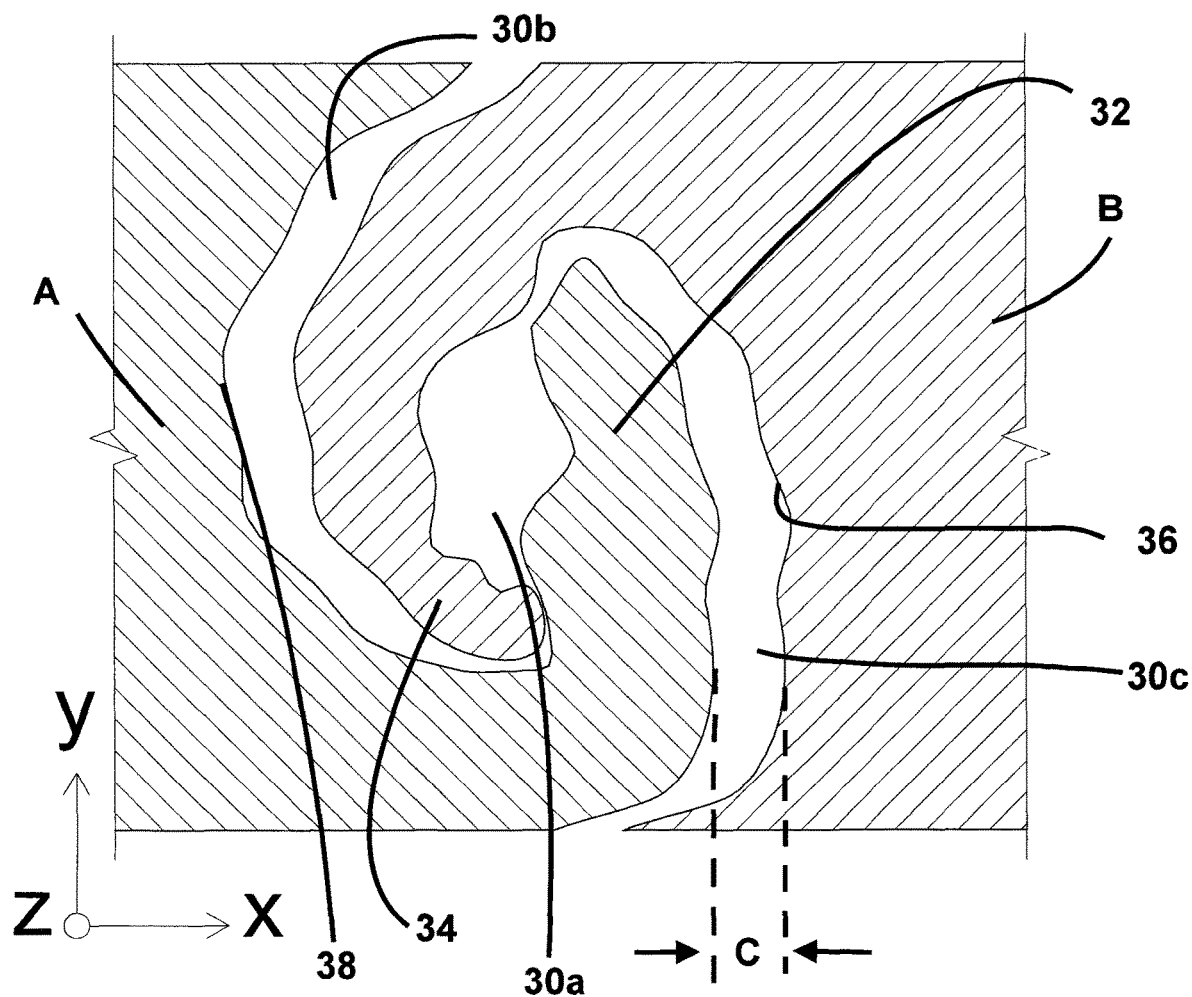
FIG. 1a is a schematic cross-sectional view showing a pair of components prior to being assembled together according to one of various exemplary embodiments.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In accordance with various exemplary embodiments, the present system includes basically a combination of a hook connection with a tongue component using a shimming (or key). The present technique modifies the shimming concept (a thin packing strip or washer often used with a number of similar washers or strips to adjust a clearance) by providing a custom built geometry that imposes force components in multiple directions of a given plane (not just the axial forces provided by typical shims), and using the present 2D shim within a hook, between the connection surface formed by the hook and the other component (thereby two structural members), to engage them into a rigid connection. The present shimming proposed works under compression, not only when the two components are pulled away from each other, but also when the connection is subject to a moment (rotational force). This allows to design the contact surfaces between the two components (the connection's cross sectional geometry) with more flexibility. This technique is possible due to precise manufacturing techniques of rigid materials.

Throughout the present description, the terms structure and component or any equivalent expression will be used interchangeably. For their parts, the terms engagement portions, tongue, groove, male, female or any other expression known in the art are also interchangeable to refer to the portion of a structure involved in a connection or engagement. The terms combination or assembly are also intended to be interchangeable, as are the terms geometry and shape. For their parts, the terms walls, wall sections, contact portions, engagement portions are intended to refer to a surface not necessary even where two structures enter in contact. The terms space, engagement-free and contact-free are interchangeable and intended to refer to wall sections of one structure that are not in contact with another structure.

Figure 1B:
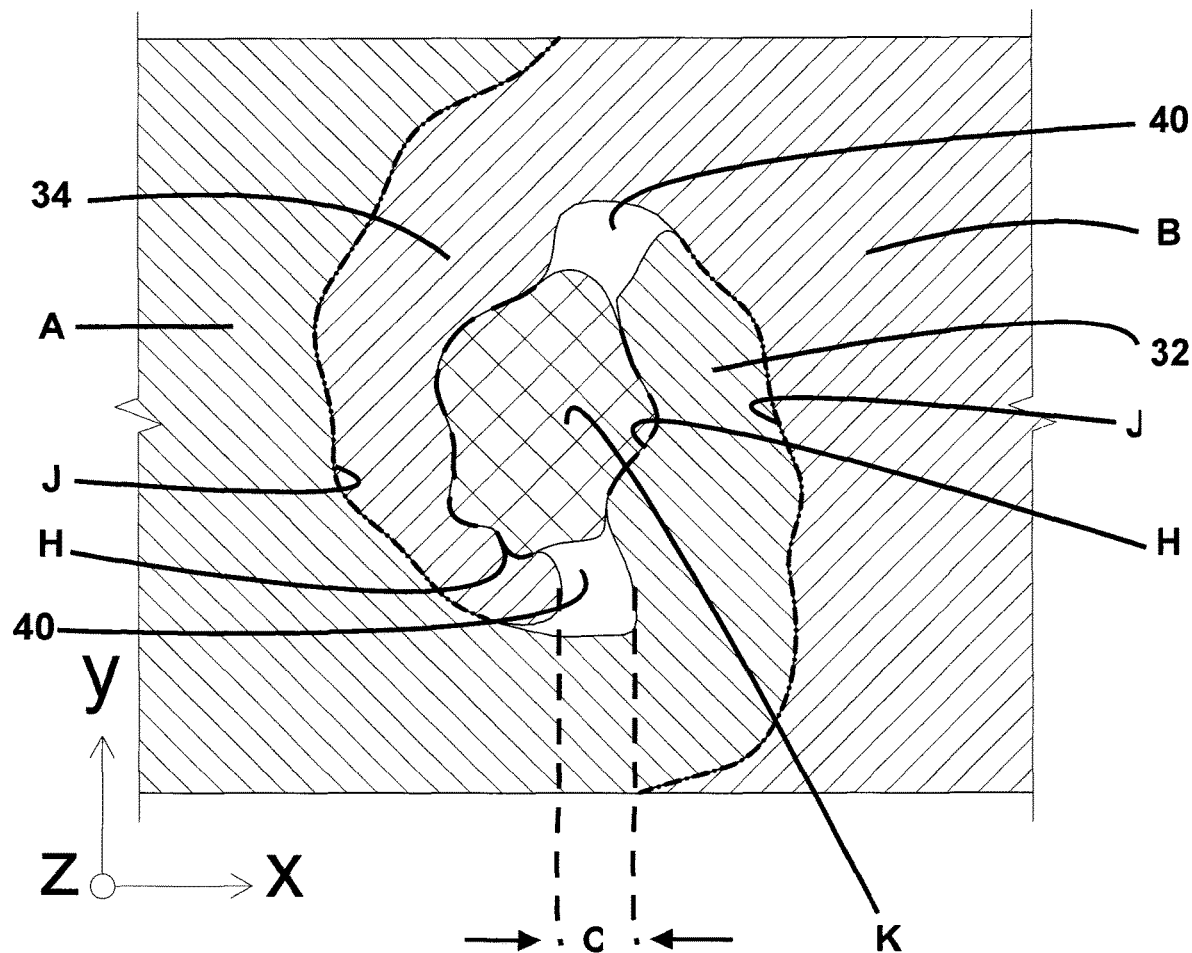
FIG. 1b is a schematic cross-sectional view showing the pair of components of FIG. 1a in an assembled position, via a key according to one of various exemplary embodiments.

With reference to FIGS. 1a and 1b, which illustrate the present system used with two structural members A and B of similar geometries and a key K having irregular configurations to demonstrate how the present principle functions. It has to be noted that with the first embodiment, the structural member A and the structural member B are permutable in relation with the function they accomplish.

The principle is to lock the two structural members A and B into a rigid connection through the longitudinal insertion of the key K perpendicularly to the xy plane that depicts the expected end rotation (i.e. along the z axis). The key K will be forcedly engaged, i.e. placed into location with a compression force in the z direction and will be transferring the forces in the xy plane, while there is negligible to no force component on the z axis to compromise the connection's rigidity. The natural forces acting on the assembly will ensure that this key K maintains its position unless intentionally removed through the exertion of force along the z axis.

In FIG. 1a, the engagement portions of the two structural members A and B are loosely engaged together with communicating spaces 30a, 30b and 30c being defined therebetween, whereas FIG. 1b illustrates the engagement portions of the two structural members A and B in an assembled position (a.k.a. rigid connection) thereof. The space 30a is provided between hook portions 32 and 34 that are part of the two structural members A and B, respectively.

The assembly of the two structural members A and B results from the third component, the key K, having been longitudinally introduced in the space 30a thereby forcibly displacing the hook portions 32 and 34 outwardly, away from one another, into outward engagement with walls sections 36 and 38 of the engagement portions of the structural members B and A, respectively. The key K typically has transverse dimensions at a leading portion thereof, which are smaller than a trailing portion thereof, thereby facilitating the introduction ok the key K in the space 30a. For instance, the key K can be tapered from a trailing end thereof towards a leading end thereof, can be pointy at the leading end, etc. Reference J depicts contact areas (a.k.a. engagement wall sections): these are wall sections between the hook portions 32 and 34 with the walls sections 36 and 38, whereas reference H depicts other contact areas: the wall sections between the key K and the hook portions 32 and 34 of the two structural members A and B. Thereby, each hook portions 32 and 34 (a.k.a. engagement portions) of the structural members A and B are both forced into an outward engagement with the complementary walls sections 38 and 36 while the key K is forced into engagement with both the complementary structural members B and A, and the hook portions 34 and 32 respectively of its own structural member A and B respectively.

All dimensions, general shape, geometry, or three-dimensional variations, should be designed and engineered to meet the requirements of specific applications. It is suggested, in order to achieve better performances, that the contact areas J and H (on all three implicated components) should have the highest surface friction coefficient possible, and that these contact areas should be designed accordingly for instance by maximizing them as much as possible or using peaks and material characteristics to generate partial penetration of one structure into another when forcibly engaged.

The two structural members A and B can be extrusions, depending on their materials.

The key K should be sized as a tight fit within the cavity or space 30a shown between the engagement portions of the two structural members A and B, and should have a narrower distal (leading) extremity or end along the z axis in order to ease its insertion when the two structural member A and B are in Position 1 (FIG. 1a).

Depending on the application and the loads implicated, the key K could be inserted, hammered, screwed, or put into position using any other linear insertion method. Once in position, the key K could be removed, releasing the two structural members A and B from one another. This could be done through the exertion of force on the key K along the z axis (by pushing, hammering out, pulling, unscrewing, or any other appropriate method).

A clearance C, on the xy plane (see Position 1 in FIG. 1a), is provided to allow easy insertion or sliding of the engagement portion of one structural member A or B into the engagement portion of the other B or A, respectively. The insertion of the key K will exert forces on the structural members A and B with an X component that will transfer this clearance distance from in the vicinity of the contact areas J and H into smaller pockets 40 defining engagement-free wall sections between the contact areas J and H, as seen at Position 2 in FIG. 1*b*.

Regarding the contact areas J between the hook portions 32 and 34 with the walls 36 and 38, it is noted that once the key K is inserted, the two structural members A and B will be pulled together and will be engaged with each other at the contact areas J, wherein, as discussed above, the contacting surfaces of the structural members A and B should correspond as much as possible. The contact areas J between the structural members A and B is an important variable in the optimization of the connection and should be designed in accordance with the specific application.

Turning to the contact areas H between the key K and the hook portions 32 and 34 of the two structural members A and B, the location of these contact areas H is to be detailed in such a way as to allow a negative X (−X) force component on the structural member B, and a positive X (+X) force component on the structural member A, with the contacting surfaces of the key K with the structural members A and B corresponding as much as possible. Inserting the key K will push on the two structural members A and B at this location to force the structural members A and B closer together until they are engaged along the J borderline or contact areas, thereby resulting in a rigid connection between the two structural members A and B.

The contact areas H between the key K and the hook portions 32 and 34 of the two structural members A and B further comprise Y force components, complementing the Y force components applicable on hook portions 32 and 34 by the walls 36 and 38. The Y force components prevent displacement of the structural members A and B according to the y axis. Therefore, the key K imposes force components in multiple directions of the given xy plane.

Now referring to FIGS. 2*a* to 2*d*, there is shown thereat another example and variation of the arrangement of FIGS. 1*a* and 1*b* with identical structural members. In the embodiment of FIGS. 2*a* to 2*d*, the two structural members are shown at 100 and 102, whereas the key is referenced as 104, in the form of a pin. The structural members 100 and 102 each define an enlarged distal end 106 and a proximal notch 108. The proximal transversal surface of each enlarged distal end 106 defines a semi-circular groove 110, each groove 110 being thus located at a distal end of its respective notch 108.

Figure 2A:
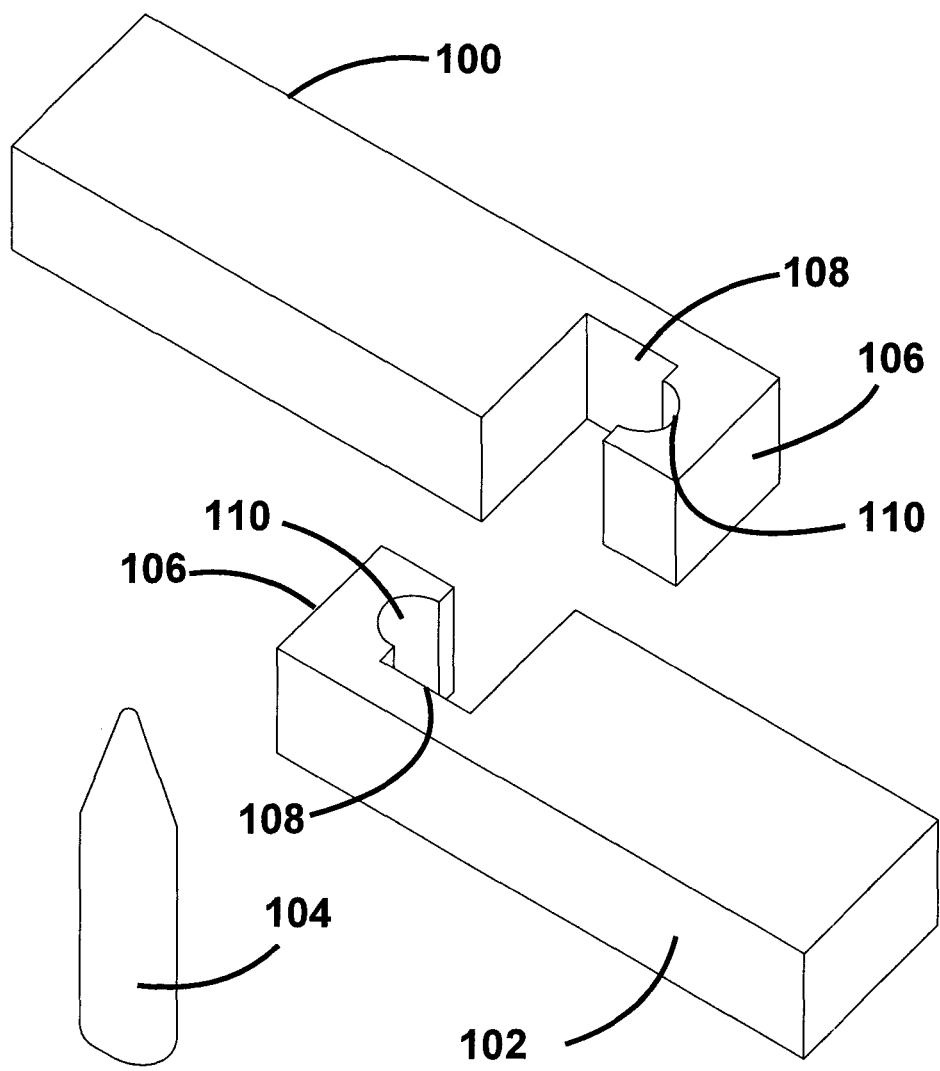
Figure 2B:
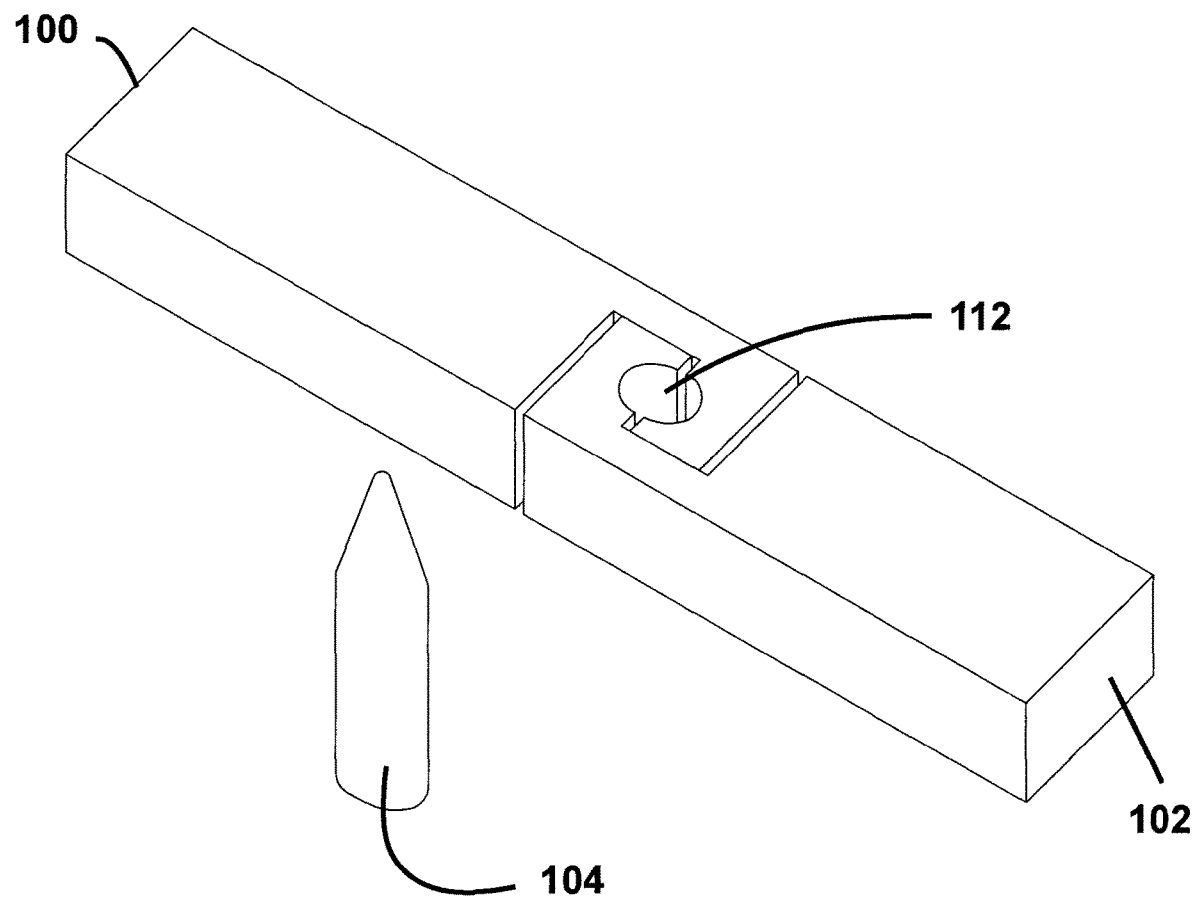

In FIG. 2*a*, the engagement portions of the structural members 100 and 102 are loosely engaged, with the proximal transversal surface of the enlarged distal ends 106 being located closely adjacent to one another such that the semi-circular grooves 110 face each other and define a substantially circular hole 112.

Figure 2C:
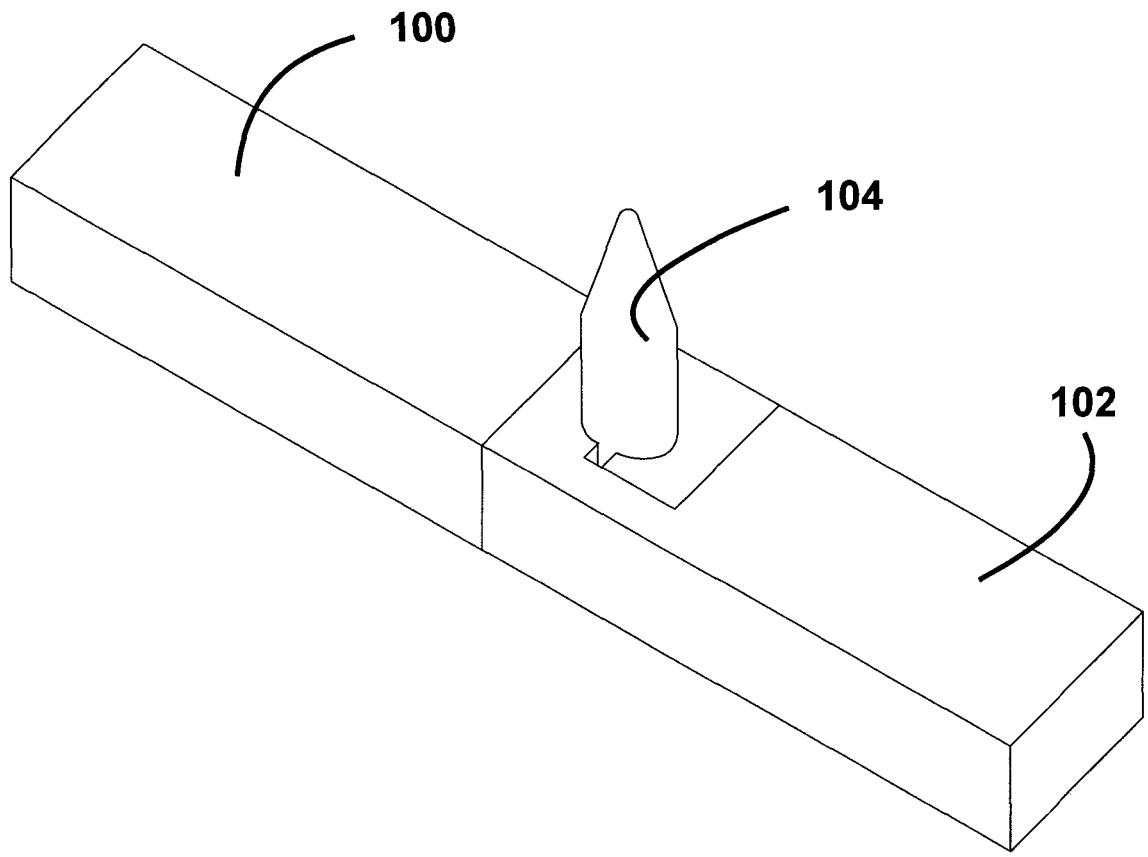
Figure 2D:
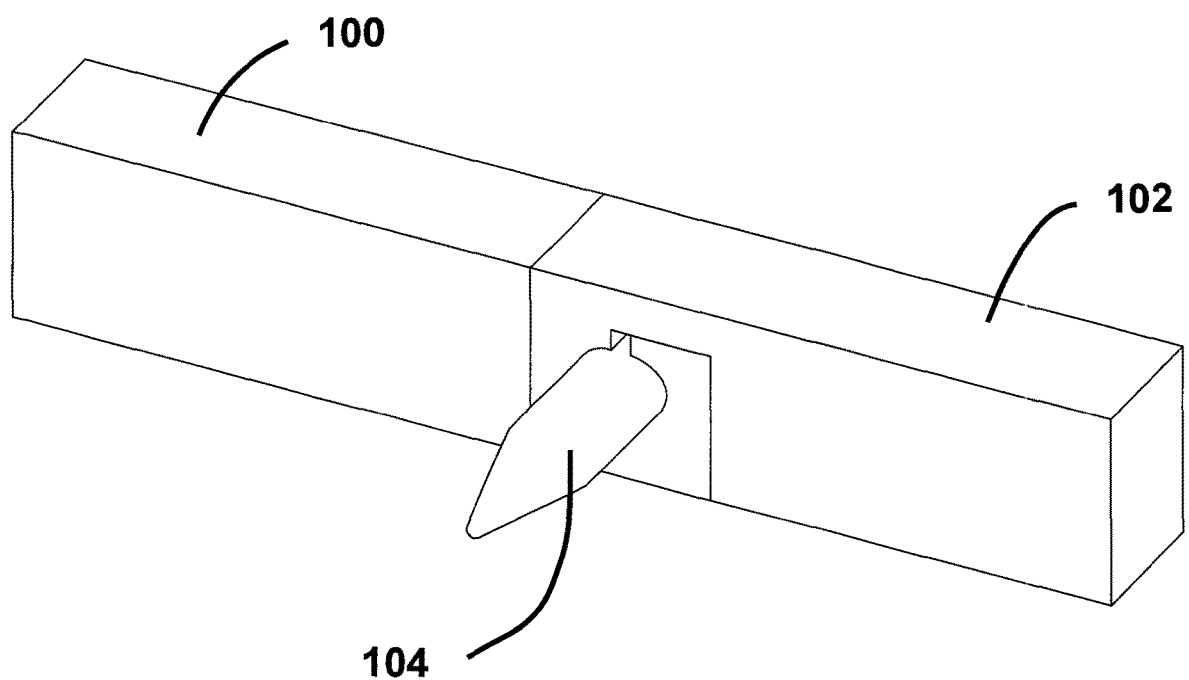

FIG. 2*c*, The key 104 is forcibly inserted in the hole 112 thereby pushing the enlarged distal ends 106 away from one another, until distal transversal surfaces of the enlarged distal ends 106 are engaged with proximal transversal surfaces of the notches 108. The resulting assembly is illustrated in FIGS. 2*c* and 2*d*.

It has to be noted that, due to the geometry of the pin, the key 104 once again imposes force components in multiple directions of the given xy plane in addition to the force component pushing the distal ends 106 away from one another.

Figure 5:
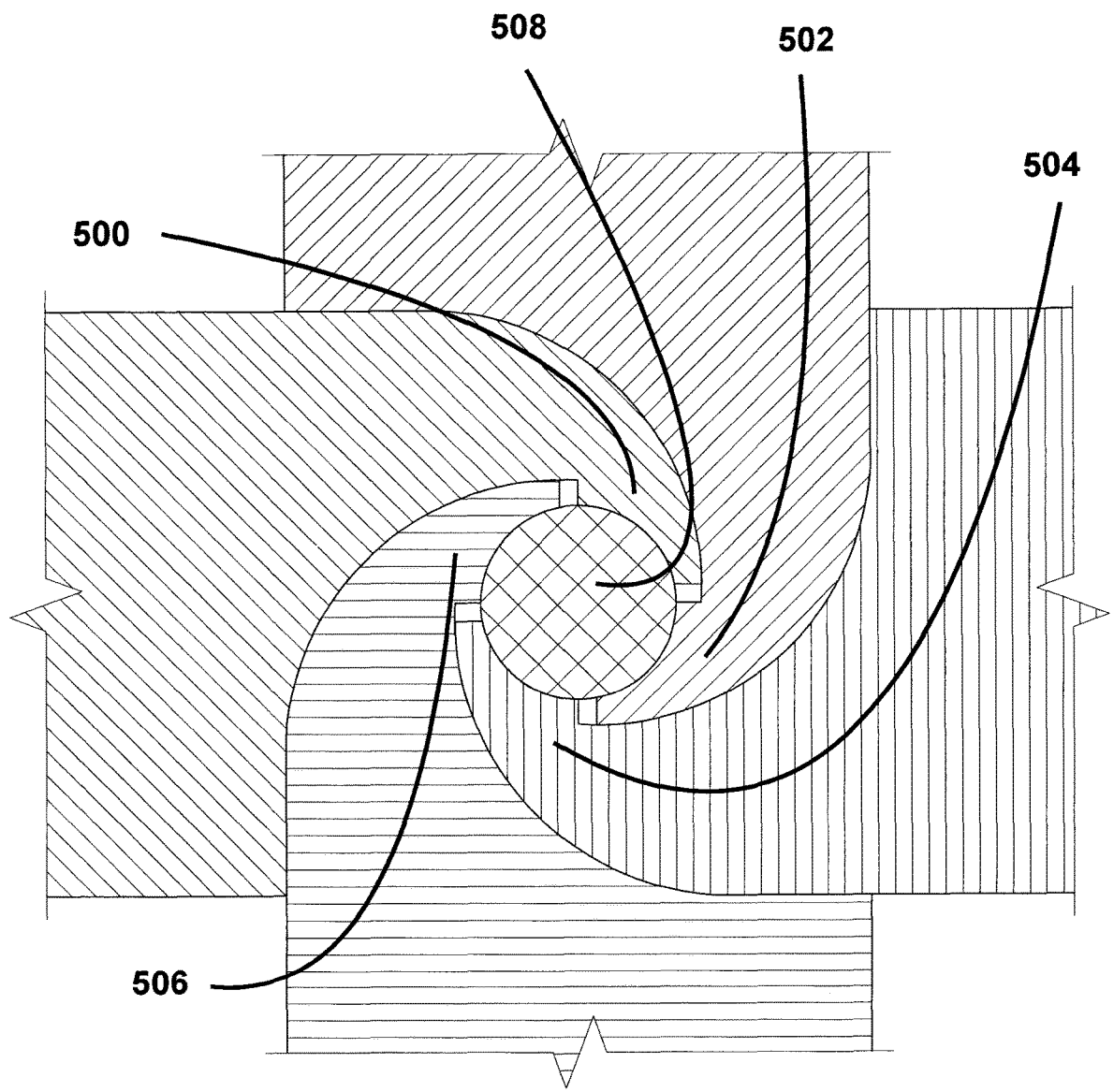
FIG. 5 is a schematic cross-section view showing four (4) components assembled together via an associated key engaged thereto according to an exemplary embodiment.
Figure 6:
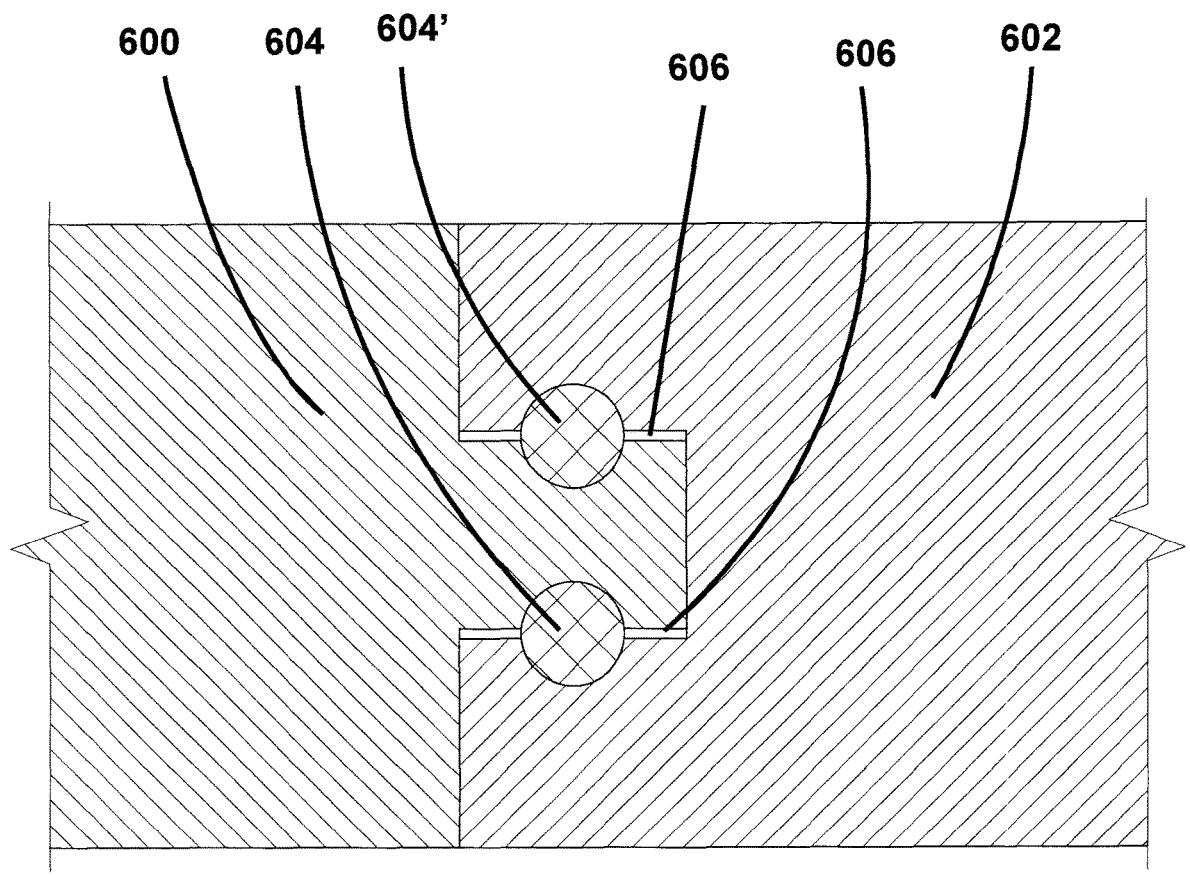
FIGS. 6 to 8 are various schematic cross-sectional views each showing a pair of components assembled together via an associated pair of keys engaged thereto according to one of various exemplary embodiments.
Figure 7:
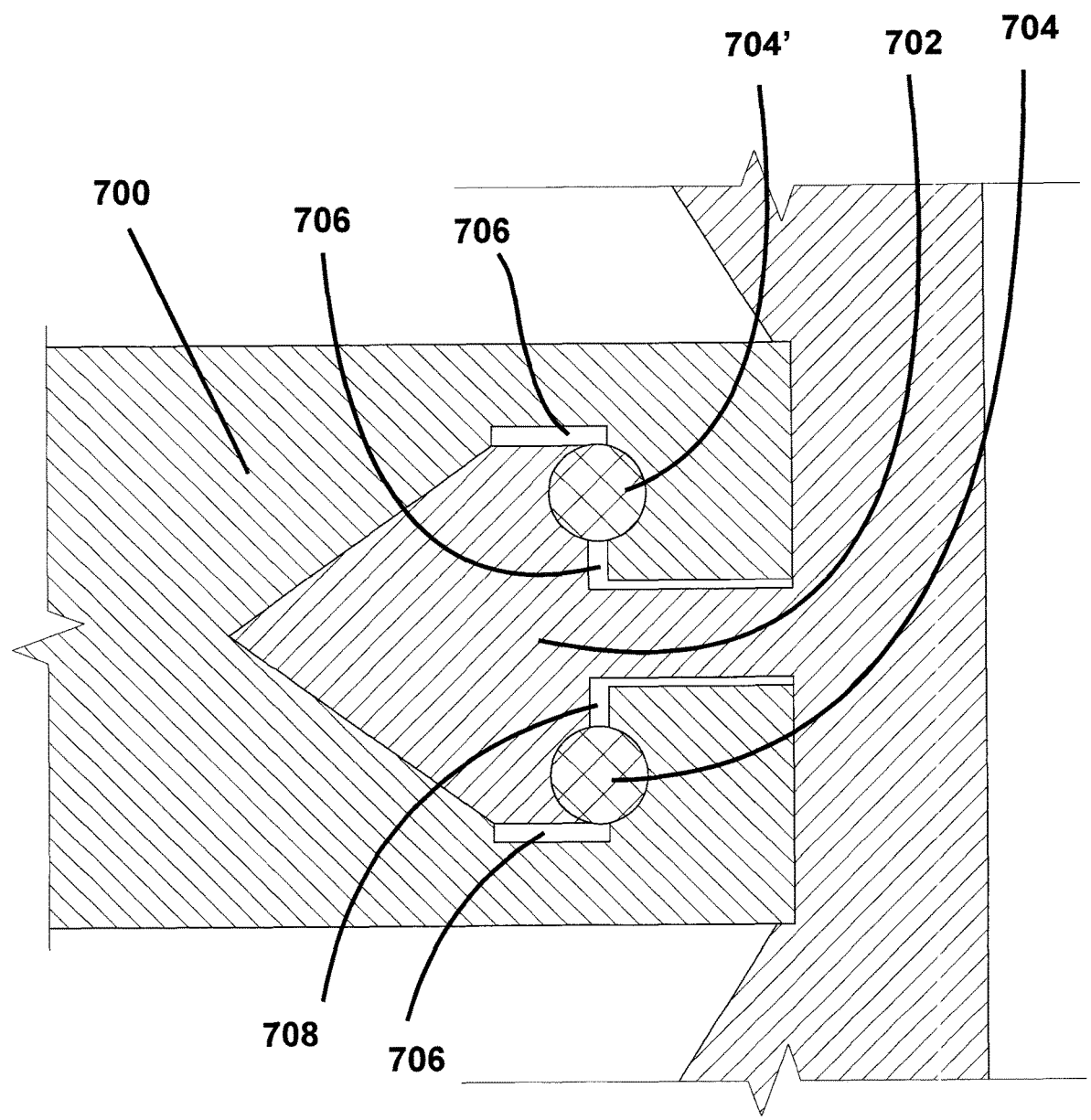
Figure 8:
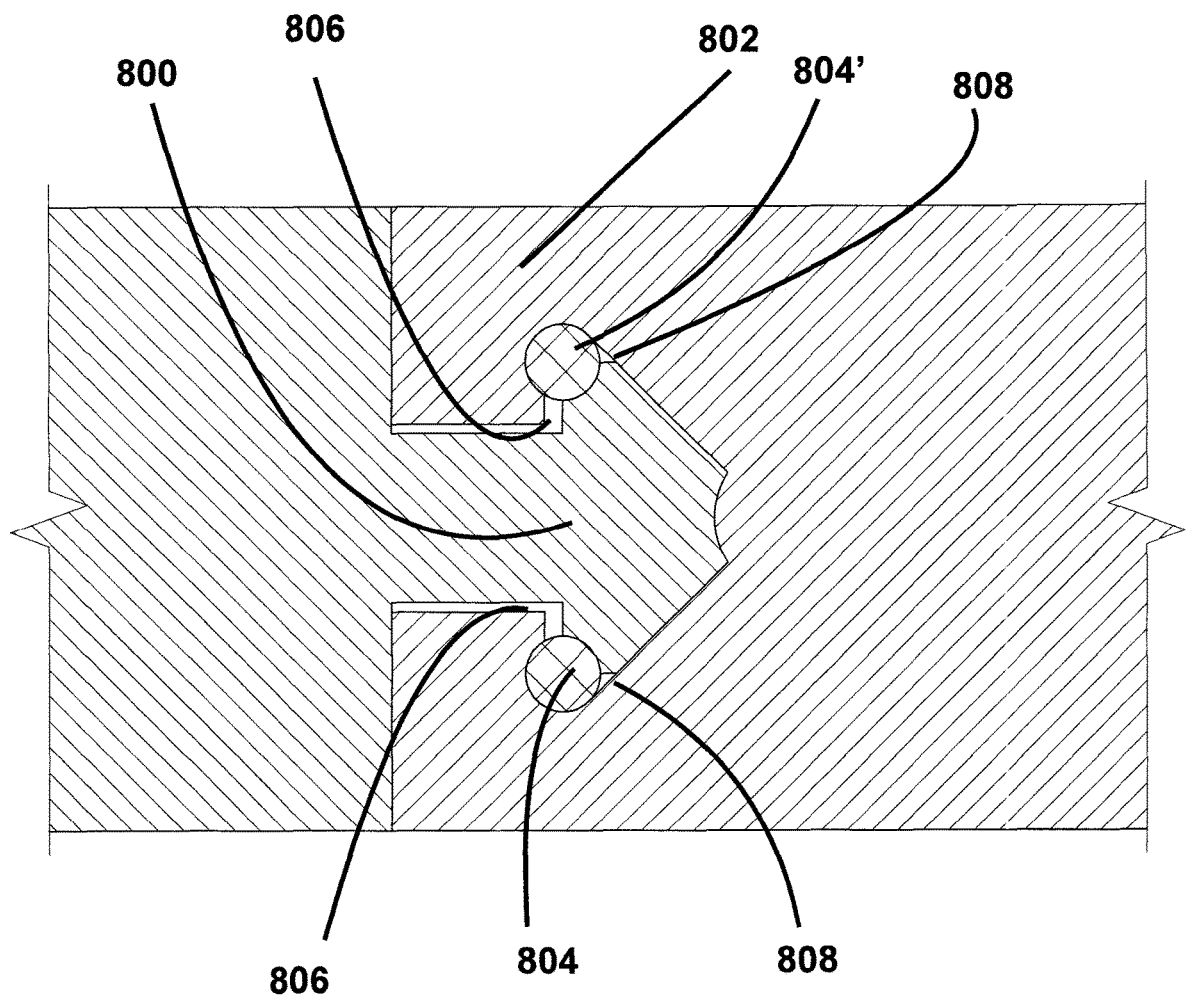

FIGS. 3, 4 and 6 to 8 illustrate other examples and variations of the principle shown in the arrangement of FIGS. 1*a* and 1*b*. In the embodiments of FIGS. 3, 4 and 6 to 8, the two structural members are shown at 300/302, 400/402, 600/602, 700/702 and 800/802, respectively. Keys, operating alone, are referenced as 304 and 404. Keys, operating in combination, are referenced as 604/604', 704/704' and 804/804'. Spaces between the components appear on each of FIGS. 3 and 4 as a pair of areas longitudinally spacing the components, with the spaces being referenced 306 and 406. In FIG. 6, spaces 606 are separated transversally the components 600 and 602. In FIGS. 7 and 8, spaces 706, 708, 806 and 808 are separating the components 700/800 from 702/802 both longitudinally and transversally. FIG. 5 illustrated an arrangement with four (4) components 500, 502, 504 and 506 connected using a single key 508.

Figure 9:
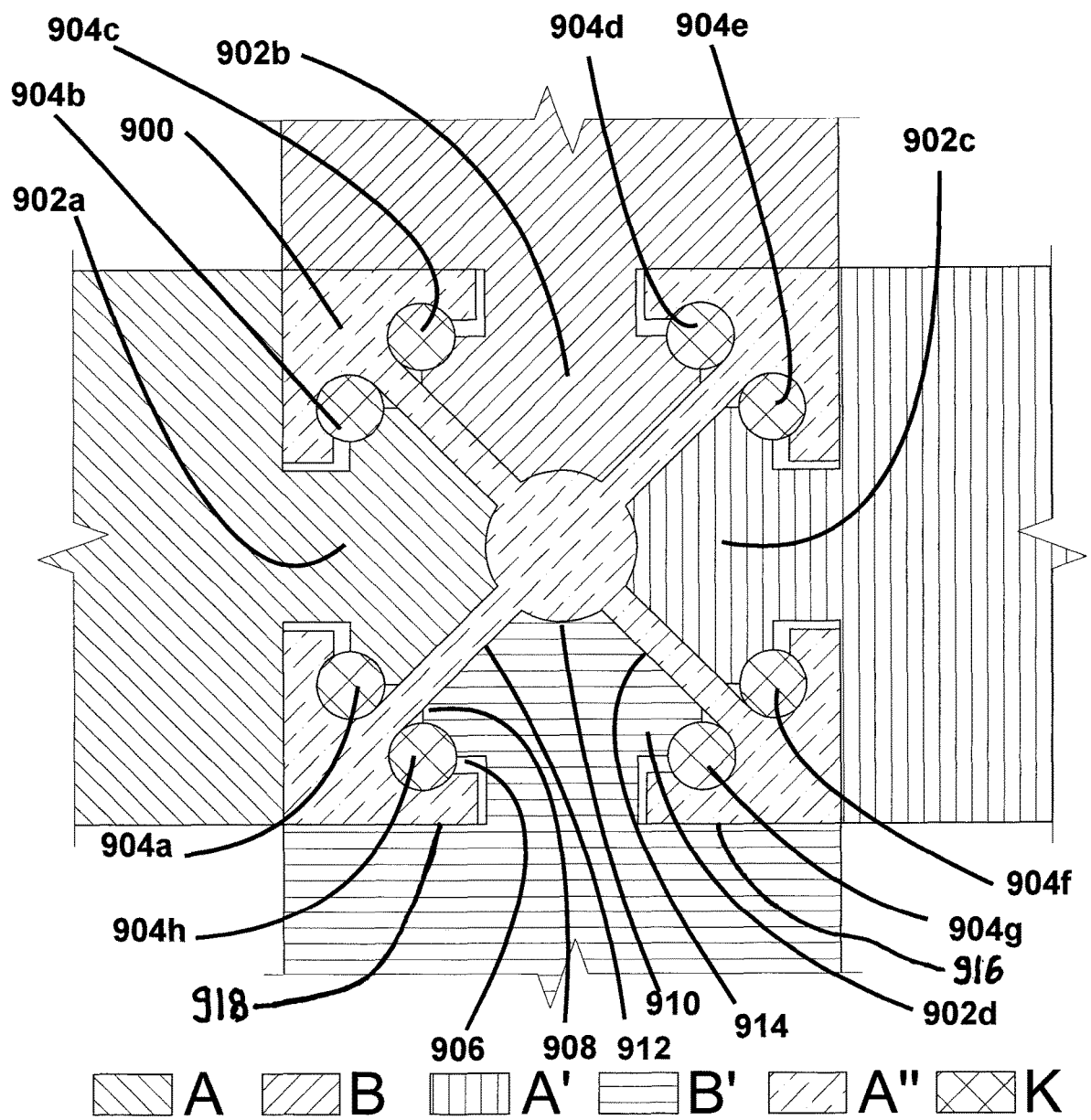
FIG. 9 is a schematic cross-section view showing four (4) components assembled to one central component, wherein each of the four (4) components is assembled via an associated pair of keys engaged thereto according to an exemplary embodiment.

FIG. 9 illustrates an embodiment describing the use of a single first component 900 to engage a plurality of second components 902*a*, 902*b*, 902*c* and 902*d*. In this case, a similar double-key solution is used as illustrated in FIG. 8. A set of eight (8) keys 904*a-h* are forcibly inserted in order to engage the components 902*a-d* with the component 900. As with other embodiments, the insertion of the keys 904*a-h* forcibly displaces the first and second engagement portions of the first and second components 900 and 902*a-d* outwardly, thereby generating spaces 906/908 opposed to engagement walls 910/912/914/916/918.

As illustrated through particularly through FIGS. 1 to 9, embodiments of the present connection assemblies may involve distinct geometries for the engaging portions of the components. The engaging portion geometry may take the shape of a hook (FIG. 1), a notch with a circular groove (FIGS. 2 to 4) and an enclosed double hook (FIGS. 6, 7, 8 and 9) with the shape of the complementary engaging portion being designed accordingly. All of these geometries provide engagement portions such as the contact surface engaging with the third component (a.k.a. the key) generate force components in multiple directions in the given xy plane.

Similarly, the inserting components features different geometries, with a portion engaging in the notch of the receiving component (a.k.a. a tongue) featuring a complementary shape to the notch geometry to maximize contact areas.

Figure 3:
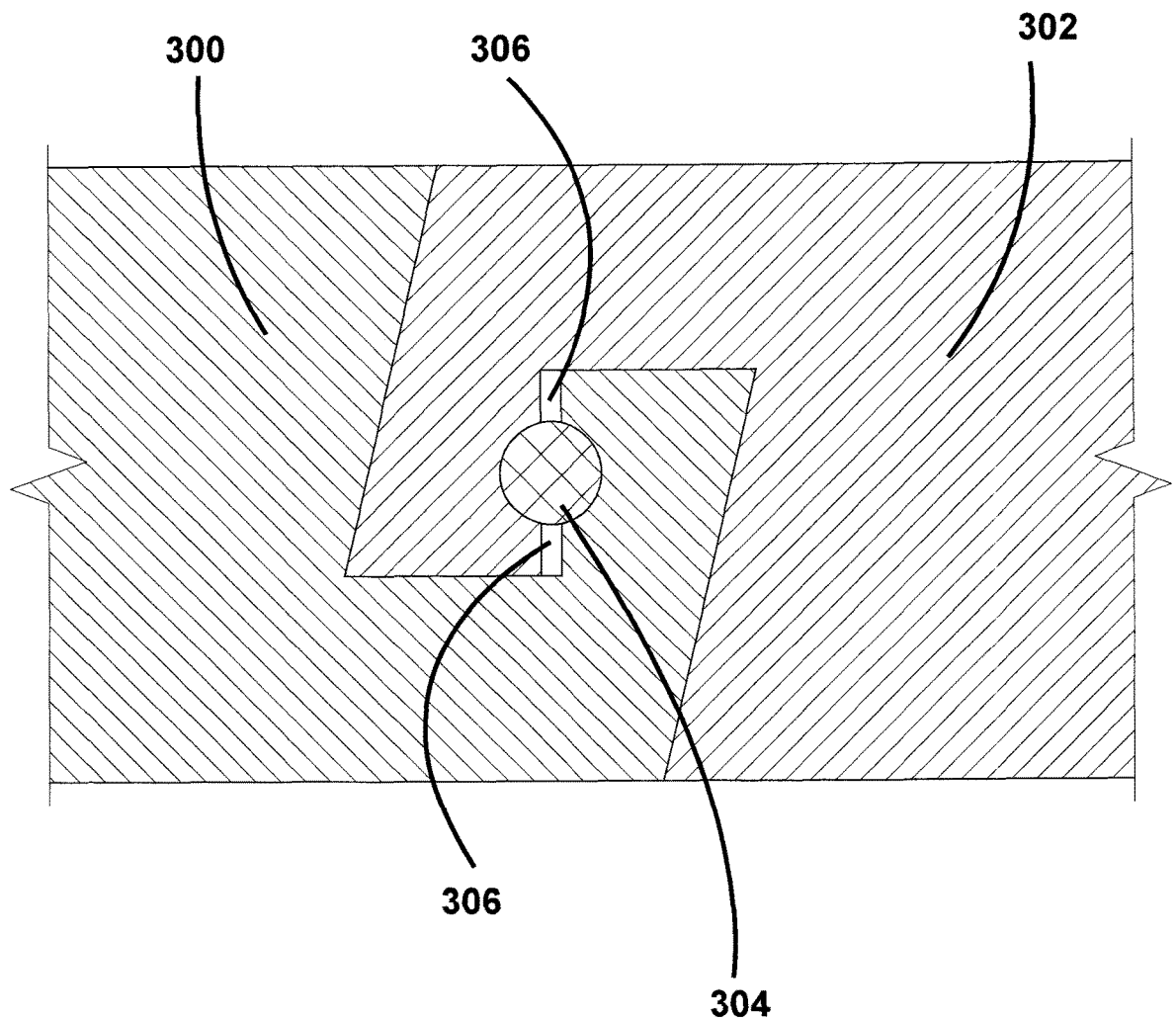
FIGS. 3 and 4 are schematic cross-section views each showing a pair of components assembled together via an associated key engaged thereto according to one of various exemplary embodiments.
Figure 4:
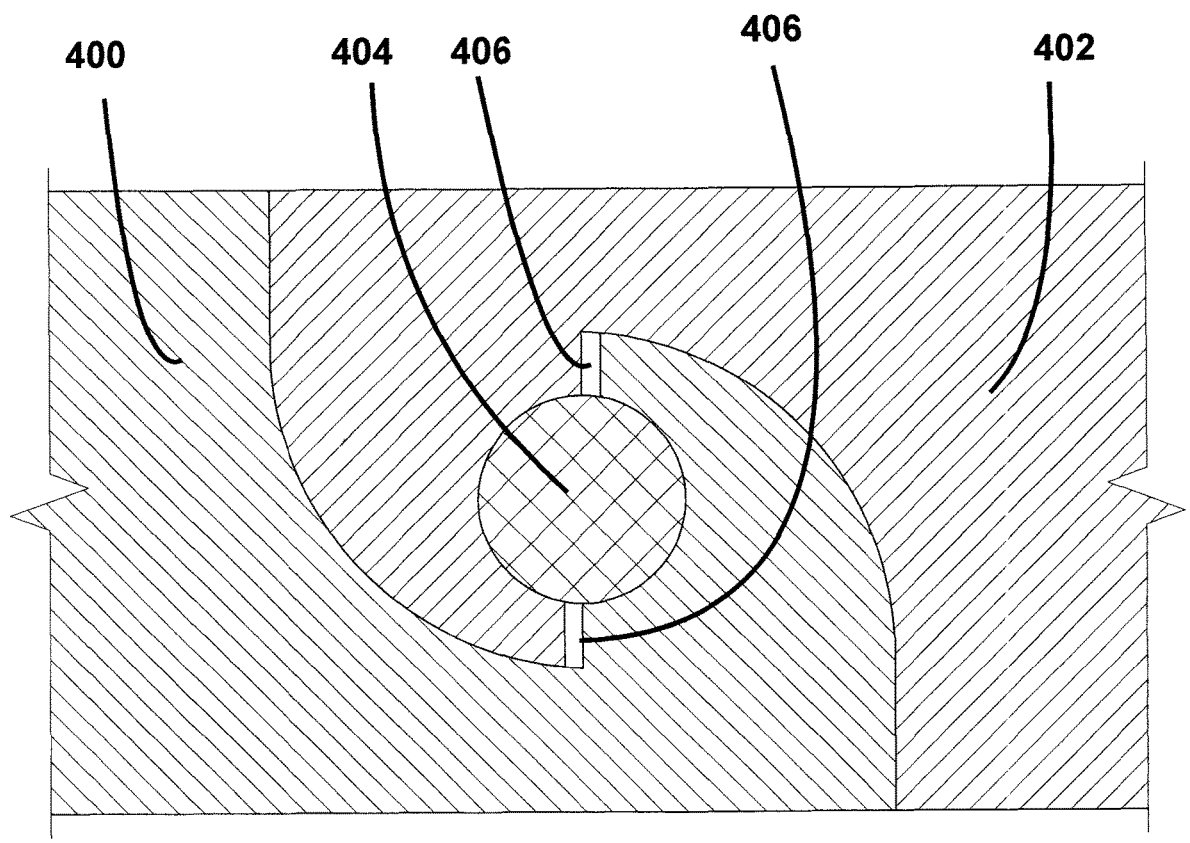

Complementarily, the geometry of the third component, the key, may be of a pin (FIGS. 2 to 9) or of a generic shape (FIG. 1) or other shapes such as a rectangular shape (not illustrated). Furthermore, as illustrated in FIG. 3 for instance, the engagement portion of one of the component (component 300) may perform a female connection function while the engagement portion of the other (component 302) performs a male connection function. Other examples, see FIGS. 1, 2, 3 and 4 may demonstrate that the engagement portions of both components perform both a female connection function and a male connection function at the same time.

Now referring to FIGS. 13 to 15, schematic illustrations of a component involved in a piece of furniture, a wall piece 1300, featuring an engagement portion 1302 having a notch shaped as two hooks similar to the one of FIG. 9.

Figure 10:
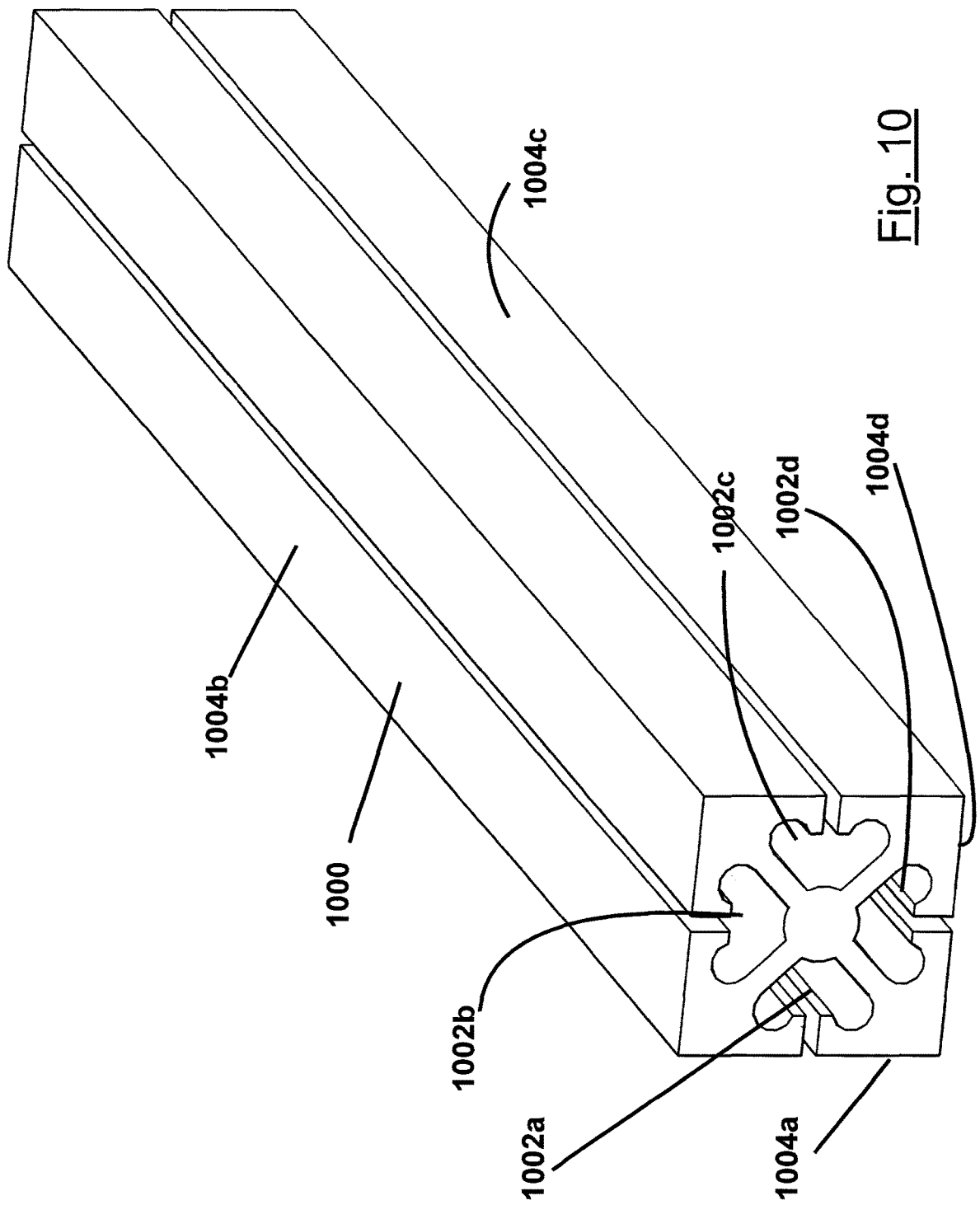
FIGS. 10 to 12 are a perspective view, a front view and a side view of one component to be assembled to up to four (4) other components according to an exemplary embodiment.
Figure 11:
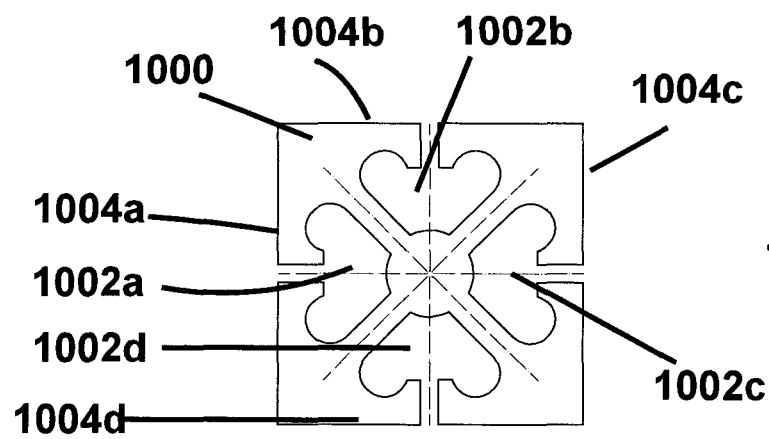
Figure 12:
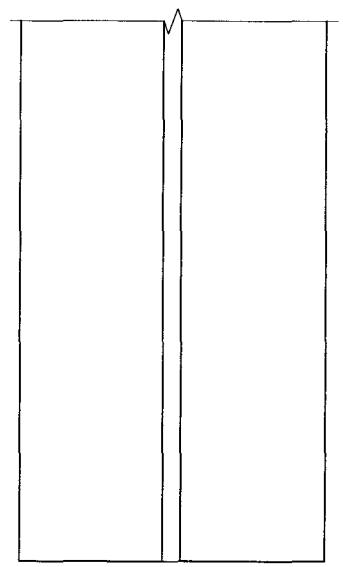

FIGS. 10 to 12 illustrate the complementary component, the corner piece 1000 through a schematic illustration and a perspective view. The corner piece consists in an extruded structure of a generally square shape, with an engagement portion 1002*a-d* on each of the four (4) faces 1004*a-d*, consisting of a double-hook shaped notch longitudinally passing through the corner piece 1000. Accordingly, assembly of the wall piece 1300 and the corner piece 1000 is performed by inserting the engagement portion 1302 of the wall piece 1300 from any of the two ends of the corner piece 1000 and sliding the wall piece 1300 into position.

FIGS. 16 to 20 illustrate a two realizations of a third component, a locking piece 1600/1900, permitting to rigidly connect the wall piece 1300 into the corner piece 1000. To lock the wall piece 1300 in place in the corner piece 1000, the wall piece 1300 must be in place and longitudinally immobilized. Then, the locking piece 1600/1900 is forcibly engaged at the end of the corner piece 1000, forcing the eight (8) pins 1602/1902/1904 into the four (4) notches 1002a-d of the corner piece 1000. In the notches 1002 having an engagement portion 1302 of the wall piece(s) 1300 inserted therein, the pins 1602/1902/1904 are pushing outwardly the engagement portions 1302 of the wall piece(s) 1300. Since the pins 1602/1902/1904 are of a circular shape with substantially similar shapes for the engaging walls of the engagement portions 1002/1302 of the wall piece(s) 1300 and the corner piece 1000, force components in multiple directions of the given xy plane (perpendicular to insertion axis of the pins 1602) are applied. Furthermore, through the rigid structure of the engagement portions 1002/1302, only a portion of the length of the pins 1602/1902/1904 may be required to be inserted between the engagement portions 1002/1302 to forces the whole length of an engagement portion 1002/1302 to engage with the complementary engaging portion 1302/1002. FIGS. 19 and 20 show a locking piece 1900 having two (2) sets of pins 1902/1904 located on opposed ends. Accordingly, the locking piece 1900 is able at the same time to secure wall pieces 1300 in two distinct corner pieces 1000 and while rigidly linking these assemblages.

To provide alignment, the above-described connection may feature a wall piece 1300 and a corner piece 1000 having the same length. As illustrated, the engagement portion 1302 of the wall piece 1300 may be present on portions of its length (see FIG. 22 for example with the engagement portion divided into four sections), normally at least two, being close to the two longitudinal ends. The corner piece 1000, for its part, usually feature its engagement portion 1002a-d on all its length. When assembled, the wall piece 1300 and corner piece 1000 are placed so as to have their ends even. Then, two locking pieces 1600 are used, one on each end to force engagement of the wall piece(s) 1300 and the corner piece 1000. When more than one wall piece 1300 has to be engagement with a corner piece 1000, all wall pieces 1300 are sled in before using the locking pieces 1600 to simultaneously engage all wall pieces 1300 to the corner piece 1000.

Figure 21:
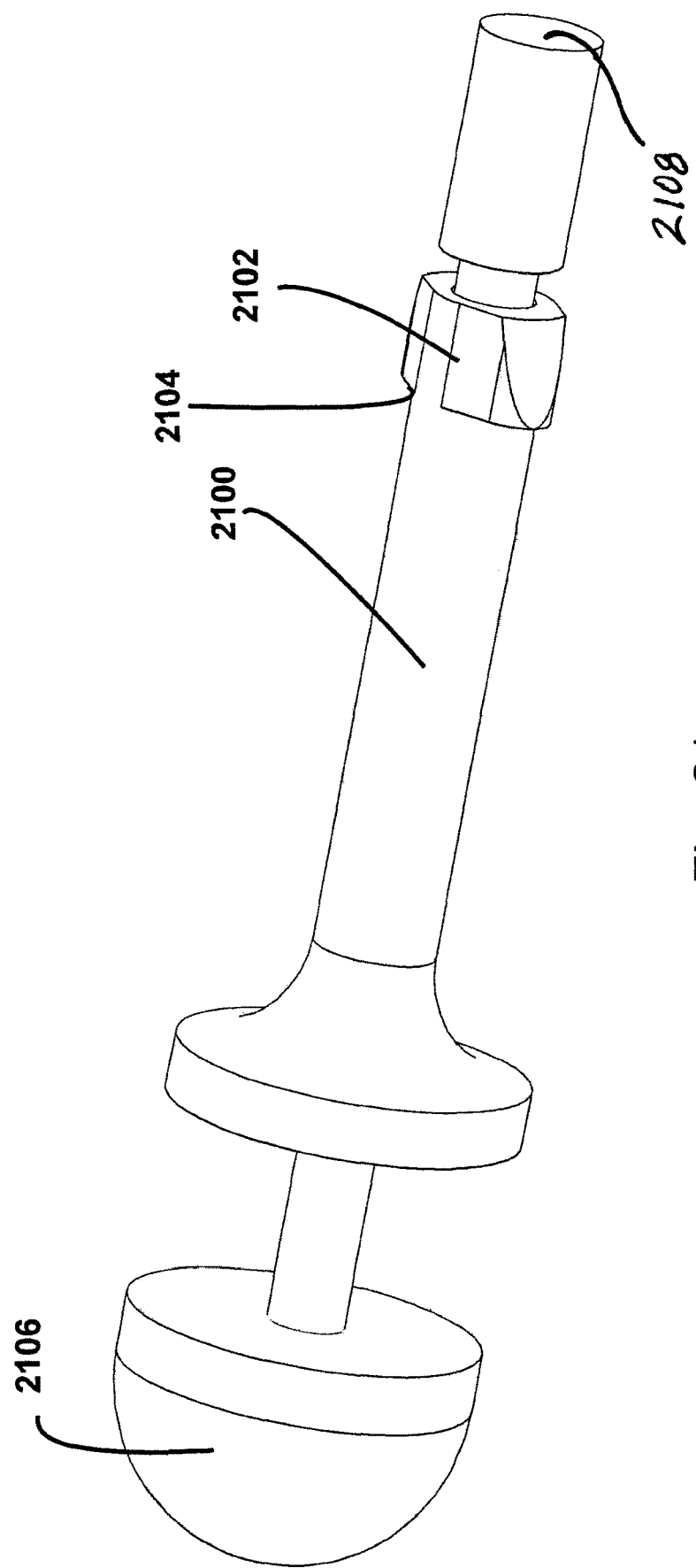
FIG. 21 is a perspective view of a component used in relation with components of FIGS. 10 to 20 for releasing the engagement therebetween.

FIG. 21 illustrates through a perspective view an embodiment of a releasing tool 2100 used to release the locking piece 1600 from the corner piece 1000. The releasing tool 2100 features an oval-shaped head 2102 with a shoulder portion 2104 at a distal end of a handling end 2106. To release the pins 1602/1902, the head 2102 of the releasing tool 2100 is inserted into the hole 1604 of the locking piece 1600 at an angle permitting to the end 2102 to penetrate the hole 1604 such that the shoulder portion 2104 is located beyond a shoulder portion 1608 (see FIG. 16) defined in the locking piece 1600 by the hole 1604. A leading end 2108 of the releasing tool 2100 also pushes against the corner piece 1000 to allow the releasing tool 2100 to pull the key 1600/1900 away from the assembly. Once inserted, the releasing tool 2100 is rotated and slightly pulled to press the shoulders portions 2104 and 1608 against each other. By pulling the releasing tool 2100, a pulling force is applied on the locking piece 1600 retrieving the pins 1602 from between engagement portions 1002/1302 of the wall piece (s) 1300 and the corner piece 1000. When the locking piece 1600/1900 is pulled out, the engagement portions 1002/1302 of the corner pieces 1000 and of the wall piece(s) 1300 reach a loosely engaged state permitting to slide out the wall piece(s) 1300 from the corner piece 1000 thereby permitting a modified configuration.

Returning to FIGS. 13 to 15, the wall piece 1300 is featured with additional engagement portions 1312a-d intended for engagement with other components than the corner piece 1000. These additional engagement portions 1312a-d may be involved in engagement functions similar to the ones above described, or to other functions.

Figure 23:
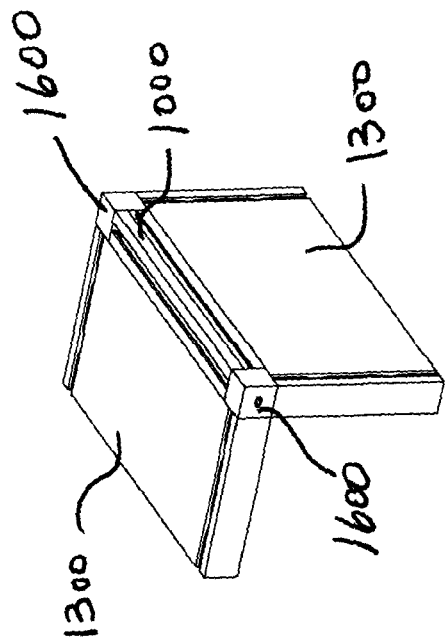
FIGS. 22 and 23 are perspective exploded and assembled views of a portion of an exemplary furniture piece comprising components of FIGS. 10 to 18.
Figure 22:
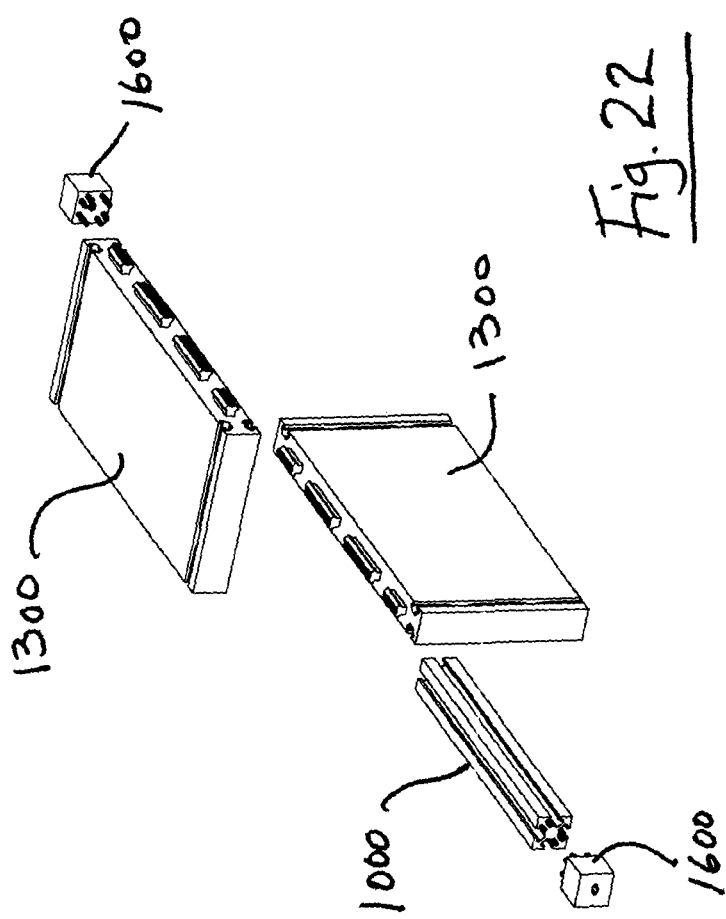

FIGS. 22 and 23 illustrate a combination of pieces, including wall pieces 1300, a corner piece 1000 and locking pieces 1600 involved in the building of a furniture piece. FIG. 22 presents an exploded view while FIG. 23 provides an assembled view of the same components with the same references as in the previous figures. As illustrated, that solution allows to engage the pieces in different configurations, release them from these configurations and arrange them into other configurations as desired.

The present principle could be considered as an option to replace or to be combined with: bolting, welding, screwing, nailing, and adhesives in between substantially all types of structural members at substantially every scale.

In manufacturing and industrial design, the present principle could be used for connecting various rigid items in product assemblies.

In the construction industry, the present principle could be used for joining structural steel members on site—post and beam systems; for joining prefabricated items to a structure (façade elements, structural elements, slabs, stairs, etc.); for the fixing of secondary structural elements (railing, hand rail, etc.); etc. This system could also be used to replace welding, bolting, and other rigid connections when time is of the essence. It could also be used for temporary structures that will require dismantling, and for connecting modules for home or building construction.

In the furniture industry, the present system could be used for joining furniture pieces in factory, without using screws, nails, or glue; as well as for joining furniture pieces on location (home built furniture, such as Ikea™ products, and the like).

With respect to the toy industry, the present system could be used for factory built toy structures, and for toys that are to be assembled at home.

As to the transportation industry, the present connection could be used in the loading and unloading effort due to its simple dismantling potential; for joining large containers together during transportation to reduce vibrations and movements; and for fixing structural items in vehicles (e.g. seats, prefabricated finishes, etc.).

In home and lifestyle applications, the present system could be used for joining framing members, eyeglasses frames, etc.

Finally, while the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. A connection assembly, comprising:
  first and second components having respective first and second engagement portions;

a third component;

said first and second components being adapted to be engaged together via the first and second engagement portions such as to define a space therebetween;

the third component being adapted to be longitudinally introduced in the space and to forcibly displace the first and second engagement portions outwardly, thereby connecting the first and second components together;

wherein each of the first and second engagement portions includes both a male and a female parts, and wherein the male part of the first engagement portion is adapted to be positioned in the female part of the second engagement portion while the male part of the second engagement portion is adapted to be positioned in the female part of the first engagement portion;

wherein a sub-space is defined between the male parts of the first and second engagement portions when the first and second components are engaged together, and wherein the third component is adapted to be positioned in the sub-space and to act directly on the male parts of both the first and second engagement portions thereby forcibly displacing the first and second engagement portions outwardly into engagement with the female parts of the second and first engagement portions, respectively.

2. The connection assembly of claim 1, wherein the third component is made of rigid material.

3. The connection assembly of claim 1, wherein the third component generates force components in multiple directions on the first engagement portion and the second engagement portion according to a xy plane perpendicular to a longitudinal insertion orientation of the third component.

4. The connection assembly of claim 1, further comprising a connection component comprising the third component and having a head, wherein the head is engagement-free from the first engagement portion and the second engagement portion.

5. The connection assembly of claim 1, wherein the third component has an engagement wall having a geometry complementary to a wall section of the first engagement portion to be engaged therewith.

6. The connection assembly of claim 1, wherein the first engagement portion has a first length, the second engagement portion has a second length, and the third component has a third length, and wherein the first length and the second length are greater than the third length.

7. The connection assembly of claim 1, wherein the first engagement portion and the second engagement portion have an identical geometry.

8. The connection assembly of claim 1, wherein both the first engagement portion and the second engagement portion have a hook shape.

9. The connection assembly of claim 1, wherein the first engagement portion has a first wall section and a second wall section, and wherein, when the third component is inserted into the space, the first wall section is engaged with the second engagement portion and the second wall section is engaged with the third component.

10. The connection assembly of claim 9, wherein the first engagement portion comprises a third wall section located between the first wall section and the second wall section, and wherein, when the third component is inserted into the space, the third wall section is engagement-free.

11. The connection assembly of claim 1, wherein the first engagement portion includes a groove adapted to be engaged with the third component.

12. The connection assembly of claim 1, further comprising:

a third-prime component and a fourth component having a fourth engagement portion, with the first component further comprising a first-prime engagement portion distinct from the first engagement portion, wherein the first component and fourth component are adapted to be engaged together via the first-prime engagement portion and the fourth engagement portion when the third-prime component is introduced therebetween and forcibly displaces the first-prime and fourth engagement portions outwardly.

13. The connection assembly of claim 12, wherein the first engagement portion and the first-prime engagement portion have identical geometries.

14. The connection assembly of claim 12, wherein the first component has first and first-prime faces and wherein the first and first-prime engagement portions are disposed with respect to the first and first-prime faces respectively.

15. The connection assembly of claim 12, further comprising a connection component comprising the third component, the third-prime component and a head, wherein the connection component is adapted so that the third component is adapted to be introduced between the first component portion and the second component portion and the third-prime component to be introduced between the first-prime component portion and the fourth component portion.

16. The connection assembly of claim 15, wherein the connection component comprises a hole with a first shoulder, the connection assembly further comprising a releasing component having a second shoulder, wherein the releasing component is adapted to be introduced in the hole and to release engagement of the first and second components when the first and second shoulders are engaged as to apply a longitudinal pulling force away from the first and second engagement portions.

17. The connection assembly of claim 15, wherein the first engagement portion has a double-hook shape and wherein the connection component is adapted so that the third and third-prime components are adapted to be introduced between the first component portion and the second component portion with respect to a first hook-shape portion and a second hook-shape portion of the first engagement portion.

18. The connection assembly of claim 1, wherein, when the first and second components are connected together via the third component, the third component is engaged to each of the first and second engagement portions and the first and second engagement portions are engaged to each other.

* * * * *